(12) United States Patent
Witzel

(10) Patent No.: US 9,237,439 B2
(45) Date of Patent: Jan. 12, 2016

(54) METHOD AND APPARATUS FOR CONFIGURING SERVICE SETTINGS FOR A MOBILE SUBSCRIBER

(75) Inventor: Andreas Witzel, Herzogenrath (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 63 days.

(21) Appl. No.: 14/345,522

(22) PCT Filed: Sep. 20, 2011

(86) PCT No.: PCT/EP2011/066289
§ 371 (c)(1),
(2), (4) Date: Mar. 18, 2014

(87) PCT Pub. No.: WO2013/041125
PCT Pub. Date: Mar. 28, 2013

(65) Prior Publication Data
US 2014/0378119 A1    Dec. 25, 2014

(51) Int. Cl.
| | |
|---|---|
| *H04M 3/00* | (2006.01) |
| *H04W 8/22* | (2009.01) |
| *H04W 4/12* | (2009.01) |
| *H04L 12/58* | (2006.01) |

(Continued)

(52) U.S. Cl.
CPC .............. *H04W 8/22* (2013.01); *H04L 51/046* (2013.01); *H04M 3/00* (2013.01); *H04W 4/12* (2013.01); *H04W 4/16* (2013.01); *H04W 8/18* (2013.01); *H04W 88/14* (2013.01); *H04W 88/184* (2013.01)

(58) Field of Classification Search
CPC ...... G06Q 50/01; H04L 65/403; H04L 41/12; H04L 51/24; H04L 51/32; H04L 67/22; H04L 51/08; H04L 67/02; H04L 41/0893; H04L 51/18; H04L 67/306; H04L 12/588; H04L 51/20; H04L 63/10; H04W 4/12

USPC .......................................................... 455/419
See application file for complete search history.

(56) References Cited

U.S. PATENT DOCUMENTS

| | | | |
|---|---|---|---|
| 2009/0103520 A1* | 4/2009 | Begall et al. .................. | 370/352 |
| 2010/0075669 A1 | 3/2010 | Sparks et al. | |
| 2011/0038287 A1* | 2/2011 | Agarwal et al. ............... | 370/310 |

FOREIGN PATENT DOCUMENTS

CN       101370185 A      2/2009

OTHER PUBLICATIONS

International Search Report, International Application No. PCT/EP2011/066289, Nov. 23, 2011.

(Continued)

*Primary Examiner* — Kwasi Karikari
(74) *Attorney, Agent, or Firm* — Myers Bigel Sibley & Sajovec, P.A.

(57) ABSTRACT

A method for configuring service settings for a mobile subscriber in a mobile communication network wherein the mobile subscriber is associated with a first instant communication client which is adapted to communicate via an instant messaging protocol with an instant communication server, and wherein the instant communication server is associated to a mobile switching center of the mobile communication network. The method includes: sending, by the first instant communication client, an instant service command via the instant communication server to a second instant communication client, associated with the mobile switching center; converting, by the mobile switching center, the instant service command into a service setting message; and sending the service setting message to a user database to modify service settings for the mobile subscriber.

17 Claims, 7 Drawing Sheets

(51) Int. Cl.
*H04W 4/16* (2009.01)
*H04W 8/18* (2009.01)
*H04W 88/14* (2009.01)
*H04W 88/18* (2009.01)

(56) References Cited

OTHER PUBLICATIONS

Written Opinion of the International Searching Authority, International Application No. PCT/EP2011/066289, Nov. 23, 2011.

Saint-Andre, Ed., Jabber Software Foundation, "Extensible Messaging and Presence Protocol (XMPP): Core", 5. JCT-VC Meeting. MPEG Meeting; Mar. 16-23, 2011; Geneva; (Joint Collaborative Team on Video Coding of ISO/IEC JTC1/SC29/WG11 and ITU-T SG.16); URL: http://wftp3.itu.int/av-arch/jctvc-site/, Internet Engineering Task Force, IETF, CH, Oct. 1, 2004, XP015009693, ISSN: 0000-3, 90 pp.

Miller, "XEP-0050: Ad-Hoc Commands v1.2", XMPP Standards Foundation (XSF), Jun. 30, 2005, XP002662654, URL:http://xmpp.org/extensions/xep-0050.pdf, 23 pp.

* cited by examiner

METHOD AND APPARATUS FOR CONFIGURING SERVICE SETTINGS FOR A MOBILE SUBSCRIBER

CROSS REFERENCE TO RELATED APPLICATION

This application is a 35 U.S.C. §371 national stage application of PCT International Application No. PCT/EP2011/0662889, filed on 20 Sep. 2011, the disclosure and content of which is incorporated by reference herein in its entirety. The above-referenced PCT International Application was published in the English language as International Publication No. WO 2013/041125 A1 on 28 Mar. 2013.

TECHNICAL FIELD

The present invention relates to a method for configuring service settings for a mobile subscriber in a mobile communication network wherein the mobile subscriber is associated with a first instant communication client which is adapted to communicate via an instant messaging protocol with an instant communication server, and wherein the instant communication server is associated to a mobile switching center of the mobile communication network. Further the invention is about a mobile switching center which is adapted to perform the method.

BACKGROUND

The Extensible Messaging and Presence Protocol (XMPP) is an open Extensible Markup Language (XML) protocol for near-real-time messaging, presence, and request-response services. These services are also named as instant messaging services. The core features of the XMPP are defined in the IETF standard RFC 3920. The basic syntax and semantics were developed originally within the Jabber open-source community. Although XMPP is not wedded to any specific network architecture, to date it usually has been implemented via a client-server architecture wherein a client utilizing XMPP accesses a server over a TCP connection, and servers also communicate with each other over TCP connections. Being an open standard, XMPP has got quite attraction in the open source community world wide and numerous free software packages exist implementing XMPP clients and XMPP server on different platforms. Some companies are basing their chat and voice offerings on XMPP specifications. FIG. 1 shows a schematic diagram of a mobile communication network which is connected to a TCP/IP-based network 100, which can be the Internet or any other TCP/IP based network. In this embodiment, three XMPP servers 111, 121, 131 are connected to the Internet 100. Two XMPP clients 112, 122 are associated to two of the XMPP server 111, 121 via a TCP/IP connection. The XMPP clients 112, 122 can e.g. be a personal computer or a laptop which are connected to the internet 100 via a normal dial-connection. As an example the address 113 of the first XMPP client 112 "client1" is "client1@XMPPserver1.domain/device1" wherein the address 123 of the second XMPP client 122 is "client2@XMPPserver2.domain/device2". In FIG. 1 and in FIG. 4, the addresses 113, 123, 133 are disclosed in a simplified form because the domain indicator and the device indicator are missing for better view. These addresses are in accordance with the standardized XMPP JID (Jabber identity) which is a combination of a user ID, a server ID and a device ID. By these addresses 113, 123, 133 all XMPP clients 112, 122, 1 can be identified and data can be routed via the internet. FIG. 1 further discloses a mobile communication network, wherein only selected components of the mobile communication network are depicted. A mobile terminal or user equipment 18 comprises a XMPP client 1. The XMPP client 1 can be an application which is stored in the UE 18. The XMPP client 1 can be associated to a XMPP server 131 e.g. via a TCP-based connection. As an example the address 133 of the XMPP client 1 is "client3@XMPPserver3.domain/UEdevice". This connection can be realized by a wireless LAN connection, wherein the UE 18 is associated to a WLAN router 19 which is further connected to the Internet 100. Another possibility is that the UE 18 is connected via the radio network 17 to a packet switched (PS) network or to an evolved packet switched (EPS) network. One setup of a PS network is depicted in FIG. 1 by a Serving GPRS Support Node (SGSN) node 15 and Gateway GPRS Support Node (GGSN) 16 which is linked via an IP based core network connection and via the Internet 100 to the XMPP server 131. The embodiment according FIG. 1 further discloses a connection between the SGSN node 15 of a packet switched network and a mobile switching node 14, which can be a MSC-S node 14 of a circuit switched (CS) network. This link between both nodes, which is called Gs interface, depicts the possibility of transferring data between both networks. A further packet switched network is the Evolved Packet Core (EPC) network, wherein one node is the Mobility Management Entity (MME), which can be linked to the MSC-S via a SGs interface. FIG. 1 does not depict further gateway nodes which might be necessary to implement a connection between a circuit-switched network and a packet switched network.

FIG. 2 shows a block diagram of a prior-art mobile switching node 14, which is in this embodiment a MSC-S node 14, wherein only selected parts are depicted. The MSC-S 14 comprises a GSM call control function 143 which contains mobile traffic coordinators for originating and/or terminating calls and emergency calls. The coordinators are mainly used for call transaction setup, call forwarding, call supervision and call release. It allows also to direct and to handle calls towards other circuit switched networks. The GSM call control function 143 is linked with the core network interface 145 which hosts the core network interfaces of the MSC-S. The core network interface 145 analyses incoming signalling which is either forwarded to another node in the core network or handled locally and terminated at a radio network interface. For outgoing signalling a routing function 146 is consulted to determine the next destination node and the physical interface to reach it. The core network interface 145 is IP (Internet Protocol) based. The GSM call control function 143 is further connected to a GSM mobility function 142 which allows the mobile terminal to roam between radio location areas and to continue ongoing calls also across radio network borders. One main function is the handover procedure to hand over a mobile terminal from one area to another. The GSM mobility function 142 or mobility management function therefore contains a logic coordinator for mobility, roaming and handover procedures and handles the location updating functions and handover functions. Furthermore the GSM mobility function 142 contains functions for packing or unpacking of signalling messages to the terminal and to the radio network belonging to mobility. Signalling messages can be used e.g. in case of authentication, identification and location updating.

The GSM mobility function 142 is connected to the A-/Iu-interface function 141 which hosts the radio network interface resources of the MSC-S 14. The MSC-S 14 further comprises a charging function 144 which is connected to the GSM call control function 143 and the core network interface 145. The charging function 144 is a basic function in the MSC-S 14 to collect traffic case related data to be used for offline billing.

The MSC-S 14 further comprises a VLR data storage 147 which stores the subscriber data. The VLR 147 is connected via an interface 6 to a home location register 4 (HLR) which is a central database that contains details of each mobile phone subscriber that is authorized to use the core network.

The MSC-S further comprises a GSM authentication component 148 which implements the GSM authentication algorithm. The GSM authentication component 148 is also connected via the interface 6 to the HLR 4 to receive and verify authentication data from the central database.

FIG. 3 depicts a block diagram of a well known XMPP server 131. The XMPP server 131 contains a XMPP stanzas router 1311 which is the backbone of the XMPP server 131. The XMPP stanzas router 1311 accepts connections from XMPP server components and passes XML (extended markup language) packets between XMPP server components. A client to server component (c2s) 1312 handles communication with associated XMPP clients. The XMPP stanzas router 1311 is connected to a XMPP session manager 1316. The session manager 1316 implements the bulk of the instant messaging features like message passing, presence, roster and subscription. The session manager 1316 is connected to data storage in order to provide persistent data storage. The associated data storage is not depicted in FIG. 3. It could be located outside the XMPP server 131 or it could be part of the XMPP server 131. Additionally the session manager 1316 handles the XMPP extensions of service discovery and privacy lists. A c2s component 1312 is connected to the XMPP stanzas router 1311 and is e.g. responsible for connecting XMPP clients 112, 122, 1 to the XMPP server 131, passing communication packets to a session manager 1316 of the XMPP server 131, authenticating XMPP clients 112, 122, 1, registering users and triggers activity with the session manager 1316. A server to server (s2s) component 1315 is connected to the XMPP stanzas router 1311 and handles communications with external XMPP servers by passing communication packets between other internal components and external servers. The s2s component 1315 further performs dial-back function to authenticate remote XMPP servers. A multi user chat (muc) 1314 is connected to the XMPP stanzas router 1311 to implement support for chat rooms. A publish subscribe component (pubsub) 1313 implements a generic functionality for providing presence. The pubsub component 1313 is connected to the Stanzas router 1311. The XMPP server 131 is connected via a TCP/IP connection to the Internet 100 such that it possible to reach this server from any other device connected to the Internet 100. The s2s component 1315 and the c2s component 1312 communicate via the Internet 100 with external clients 112, 122, 1 and external server 111, 121.

If a mobile subscriber of a mobile terminal wants to change service settings in the mobile communication network, like call forwarding or call barring he has to use a mobile terminal to send commands to the MSC-S which afterwards set-up the settings in the user database. If the user does not have a 2G/3G mobile terminal available he cannot change the service settings even if the user is equipped with an XMPP client 1. XMPP technology includes several technologies used to send commands from one XMPP client to another XMPP client. With these commands it is possible to remote control other XMPP clients which are associated with the same user. One technology is the ad-hoc command protocol as defined in the XMPP extension protocol standard XEP-0050. This XMPP extension provides workflow capabilities that can be used for any structured interaction between two XMPP entities.

SUMMARY

It is an object of the present invention to provide above described instant messaging services to configure services in a mobile communication network. This object is achieved by the independent claims. Advantageous embodiments are described in the dependent claims.

According to one aspect this object is achieved by a method for configuring service settings for a mobile subscriber in a mobile communication network wherein the mobile subscriber is associated with a first instant communication client. The instant communication client is adapted to communicate via an instant messaging protocol with an instant communication server, and wherein the instant communication server is associated to a mobile switching center of the mobile communication network. The method comprises the step of sending, by the first instant communication client, an instant service command via the instant communication server to a second instant communication client, associated with the mobile switching center. Further the method comprises the step of converting, by the mobile switching center, the instant service command into a service setting message and to send the service setting message to a user database to modify service settings for the mobile subscriber. With this method it is possible for a subscriber of a mobile communication service to manage mobile communication services, like call forwarding or call barring, with an instant communication client without using a mobile phone device.

In a further embodiment of the invention the second instant communication client is assigned to the mobile subscriber.

In a further embodiment the second instant communication client is established and registered at the instant communication server after the first instant communication client has been registered at the instant communication server. The mobile switching center is able to handle the establishment and cancellation of the second instant communication client flexible according to the amount of remaining memory.

In a further embodiment the second instant communication client is established by obtaining mobile subscriber data from the user database. No manual input is needed from an operator.

In a further embodiment the first instant communication client queries a list of supported instant service commands from the second instant communication client and sending the instant service command only if the instant service command is in the list of supported instant service commands. This will prevent the use of ad-hoc commands which are not supported by the second communication client or the user database. Sending non-supported ad-hoc commands can cause additional network traffic.

In a further embodiment a service setting message is automatically sent to the user database to activate a call forwarding service to the first instant communication client if the first instant communication client has been registered at the instant communication server, or to deactivate a call forwarding service to the first instant communication client if the registration of the first instant communication client at the instant communication server has been canceled.

In a further embodiment the mobile switching center queries the number of the visitor location register, VLR, of a second mobile switching center which serves the mobile subscriber from the user database and using the queried VLR number when converting the instant service command into a service setting message.

The object is further achieved by a mobile switching center, comprising an instant communication server, adapted to receive an instant service command from a first instant communication client and to route the instant service command to a second instant communication client. The instant communication server can be a part of software which has been installed in the memory of the mobile switching center. The instant communication server could also be a hardware module in the mobile switching center which is connected to other hardware modules of the mobile switching center. The mobile switching center further comprises a second instant communication client, adapted to receive the instant service command and forward the instant service command to a converter if the instant service command is for setting up a service in a user database. The second instant communication client can be a virtual instance or a bot which is established in the memory of the mobile switching center.

Further the mobile switching center comprises a converter, adapted to receive the instant service command from the second instant communication client, to convert the instant service command into a service setting message, and to send the converted service setting command to a user database. The converter can be realized in a processing unit.

The mobile switching center can be further adapted to perform all the steps of the prescribed methods The present invention also concerns computer programs comprising portions of software codes in order to implement the method as described above when operated by a respective processing unit of a user device and a recipient device. The computer program can be stored on a computer-readable medium. The computer-readable medium can be a permanent or rewritable memory within the user device or the recipient device or located externally. The respective computer program can also be transferred to the user device or recipient device for example via a cable or a wireless link as a sequence of signals.

In the following, detailed embodiments of the present invention shall be described in order to give the skilled person a full and complete understanding. However, these embodiments are illustrative and not intended to be limiting.

DETAILED DESCRIPTION

Figure 1:
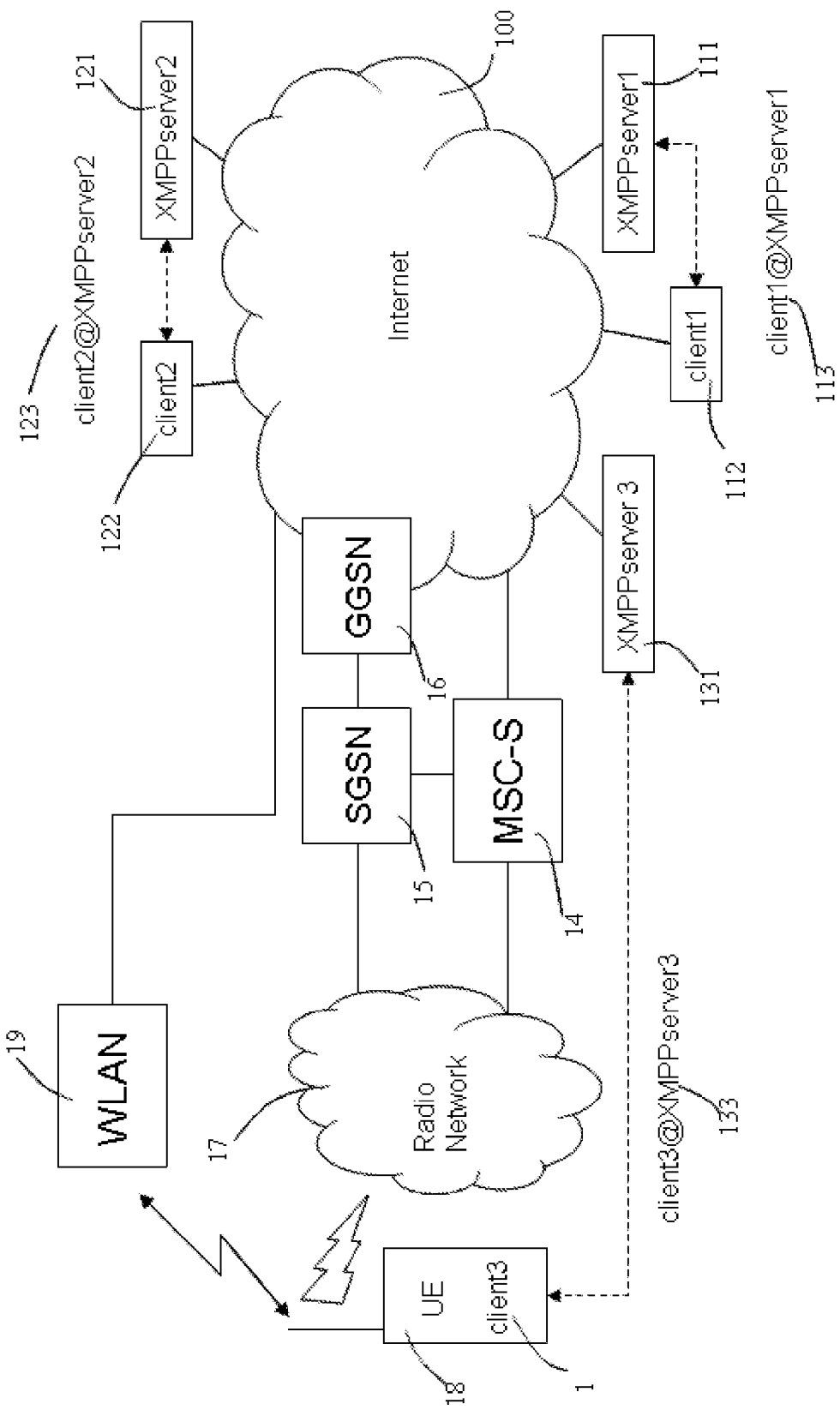
FIG. 1 shows a schematic diagram of a mobile communication network which is connected to a TCP/IP-based network according to the prior art.
Figure 2:
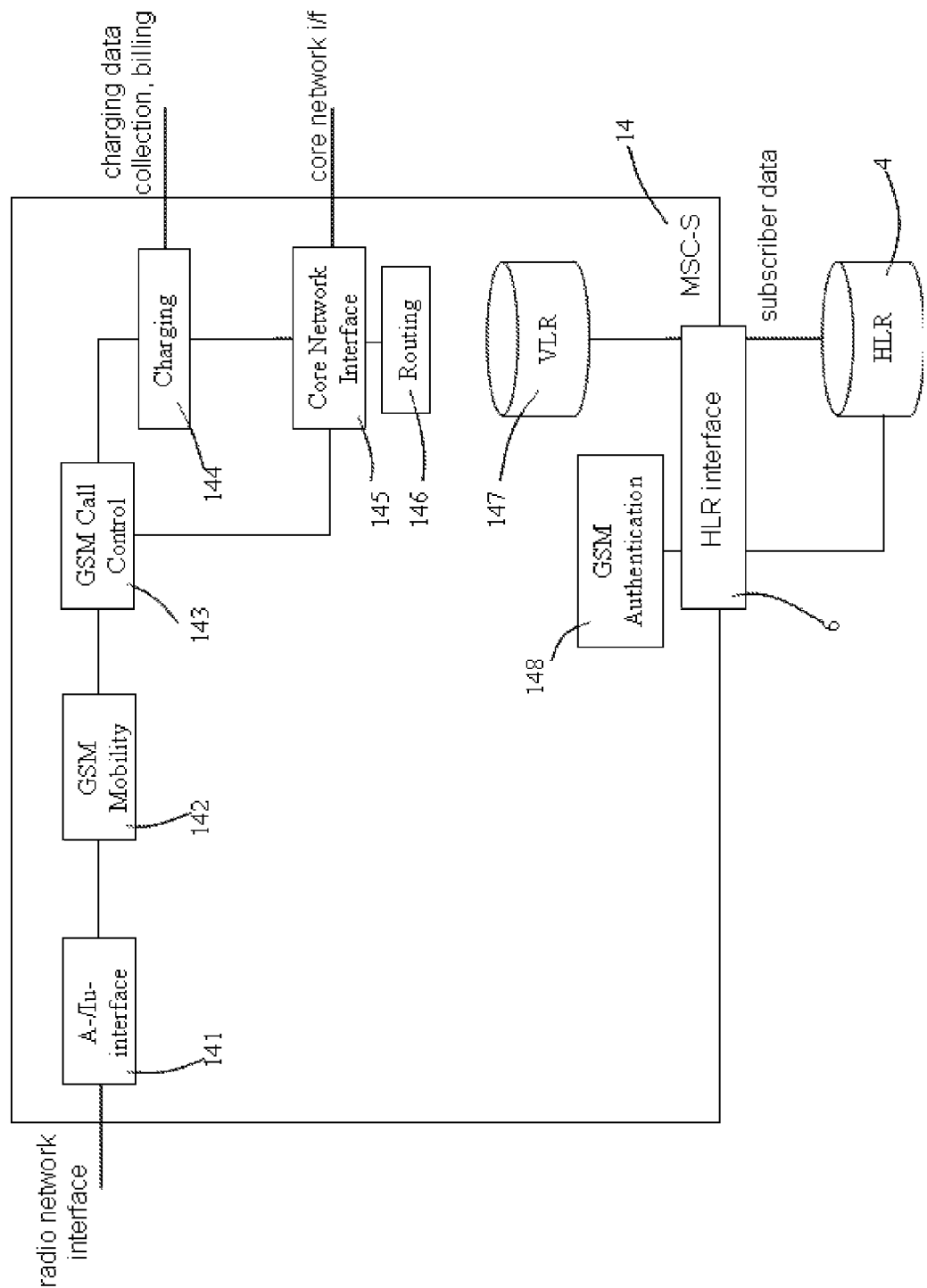
FIG. 2 shows a block diagram of an embodiment of a mobile switching node according to the prior art.
Figure 3:
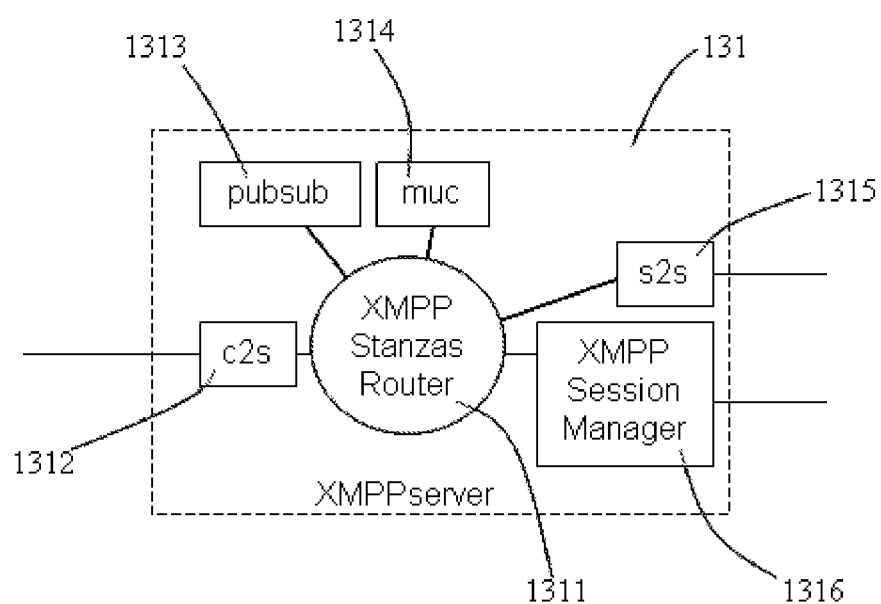
FIG. 3 shows a block diagram of an embodiment of an instant communication server according to the prior art.
Figure 4:
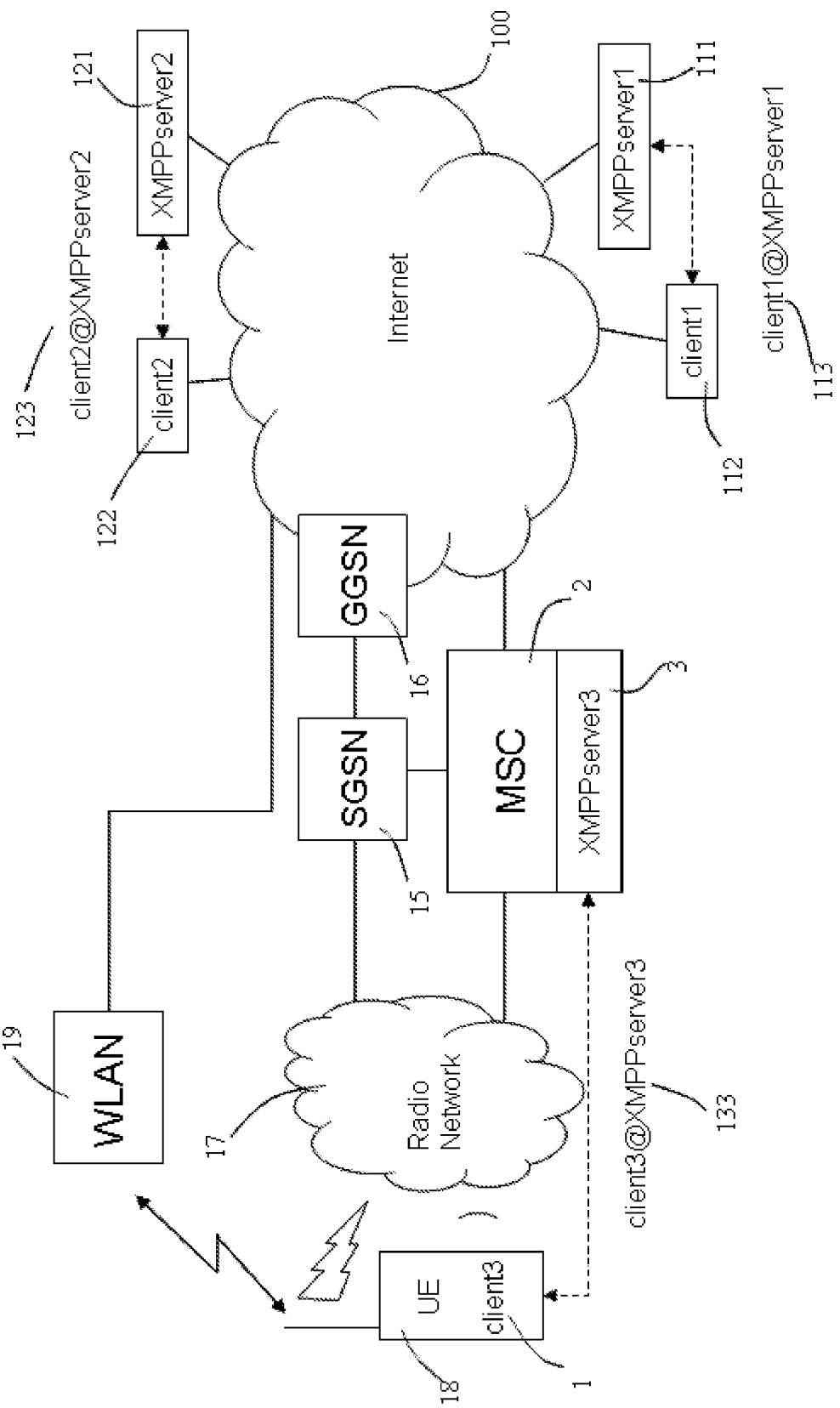
FIG. 4 shows an embodiment of a schematic diagram of a mobile communication network which is connected to a TCP/IP-based network.

FIG. 4 depicts one embodiment of the invention. A XMPP server 3 is associated to the MSC-S 2 of a mobile communication network which can also be understood as a MSC/VLR. It is possible that the XMPP server 3 is an integral part of the MSC-S 2. Therefore the MSC-S 2 is enhanced by the XMPP server 3. The XMPP server 3 can also be a server node which is logically associated to the MSC-S 2 to use at least some of the MSC-S functions. The embodiment according FIG. 4 further discloses a Gs-connection between the SGSN node 15 of a packet switched network and the MSC node 2 of a circuit switched network. This link between both nodes depicts the possibility of transferring data between both mobile networks. FIG. 4 does not depict further gateway nodes which might be necessary to implement a connection between a circuit-switched network and a packet switched network. Another alternative for a packet switched network is the EPC network which comprises a MME. The MME is connected via a SGs interface to the MSC-S 2.

Figure 5:
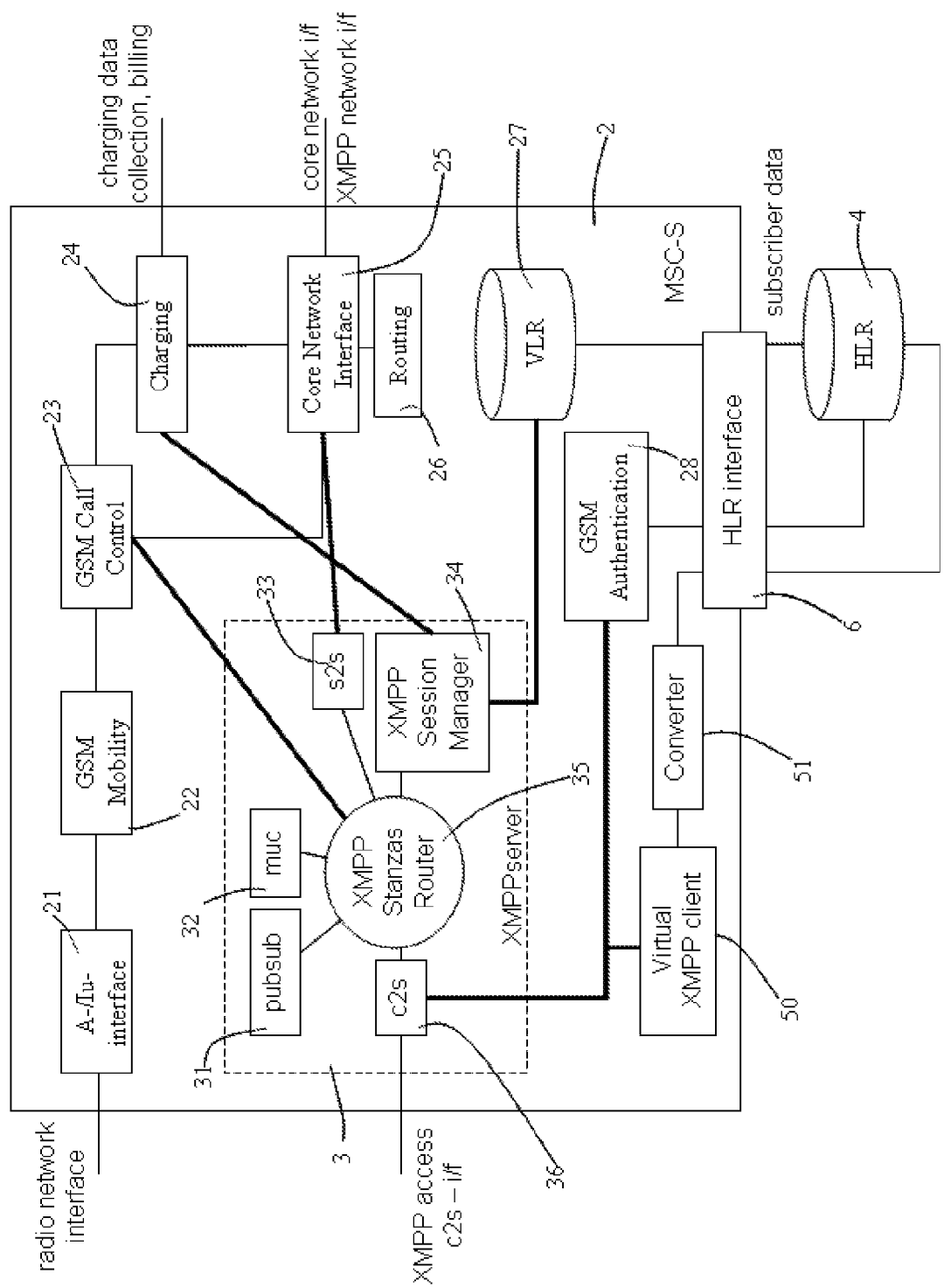
FIG. 5 shows a block diagram of an embodiment of a mobile switching node with an integrated instant communication server and an instant communication client.

FIG. 5 depicts one embodiment of a MSC-S 2 with an integrated XMPP server 3 according to one aspect of the invention. The XMPP server 3 can be a separate module which is inserted as a hardware component into the MSC-S hardware. The XMPP server 3 could be a separate plug-in-card which can be inserted into a rack which comprises among others several MSC-S plug-in-cards. Another possibility is that the XMPP server 3 is an instance running in the memory of the MSC-S 2 as an application or procedure. The XMPP server 3 is logically associated to the MSC-S 2. In the embodiment of FIG. 5 the XMPP stanzas router 35 of the XMPP server 3 is connected to the GSM call control function 23 of the MSC-S for XMPP-CS interworking to perform the conversion between the XMPP protocol and the CS protocol at breakout. Further the XMPP session manager 34 of the XMPP server 3 is connected to the charging function 24 of the MSC-S 2 to add XMPP related data to the charging information. E.g. when the session manager 34 reports information about a chat session to the charging function of the MSC-S 2 the operator of this mobile network is able to charge e.g. the duration of the chat or the number of chat messages.

The XMPP session manager 34 is further connected to the visitor location register (VLR) 27 of the MSC-S 2. The VLR 27 is associated to the MSC-S 2 and can be located inside the MSC-S 2 or can be an outside entity which is e.g. inserted into a rack which comprises among others the MSC-S 2 plug in card. This subscriber storage area can now be used as persistent data storage for the XMPP protocol for offline messages or privacy lists.

The GSM authentication function 28 of the MSC-S 2 is connected via the c2s component 36 with the XMPP stanzas router 35. The GSM authentication function 28 can be used by the c2s component 36 to authenticate a XMPP client or user.

The XMPP stanzas router 35 is connected via the s2s component 33 with the core network interface 25 and the routing function 26 of the MSC-S 2. The routing function 26 acts in support of the s2s component to resolve hostnames for the s2s component 25 as part of the XMPP dial-back authentication. The dial-back authentication, as mentioned in the RFC standard 3920, is for verification of the identity of an originating XMPP server. The s2s component 33 can reuse the existing IP network interface of the MSC-S node 2 and the core network of the mobile communication network to send communication data to another XMPP server 111, 121 which can be located anywhere in the Internet 100 or in another node of the same or another mobile communication network.

According to one embodiment of the invention, the c2s component 36 is connected to a second XMPP client 50. This second XMPP client 50 can be a virtual instance or bot which has been established or instantiated in the storage of the MSC-S 2 as a virtual instance or a procedure. The establishment of the second XMPP client 50 can be triggered by the XMPP server 3 after an external XMPP client 1 has been registered at the XMPP server 3. The second XMPP client 50 can be associated to the same user as the registered external XMPP client 1 in the UE 18. This can e.g. be done by obtaining mobile subscriber data from a user database when the second XMPP client 50 is established. The user database could be the implemented VLR 27 or the external home location register (HLR) 4. The second XMPP client 50 remains active over a predefined time after the first registration of the external first XMPP client 1 at the XMPP server 3 and will be deleted or inactivated if e.g. the external XMPP client 1 remains silent over a specific time period or has been de-registered at the XMPP server 3.

Each virtual XMPP client 50 is associated to a converter 51 which is adapted to convert messages from the virtual XMPP client 50 into a format which can be processed by the entities of the mobile communication network (e.g. HLR 4) or vice versa. The converter 51 can be an integrated part of the second XMPP client 50 or it can be a further module in the MSC-S 2 which is linked to the virtual XMPP client 50 and via a HLR interface 6 with the HLR 4.

One example of a message format which can be processed by the HLR 4 is the mobile application part (MAP) message. The MAP message is used for communication between different SS7-instances of a mobile communication network, e.g. HLR, the VLR or the MSC. The converter 51 is adapted to convert MAP messages into XMPP messages such that the virtual XMPP client 50 is able to process these messages. FIG. 5 shows a connection between the virtual XMPP client 50 via the converter 51 and over a HLR interface 6 to the HLR 4 so that the virtual XMPP client 50 is able to communicate with the HLR 4 via the converter 51.

Figure 6:
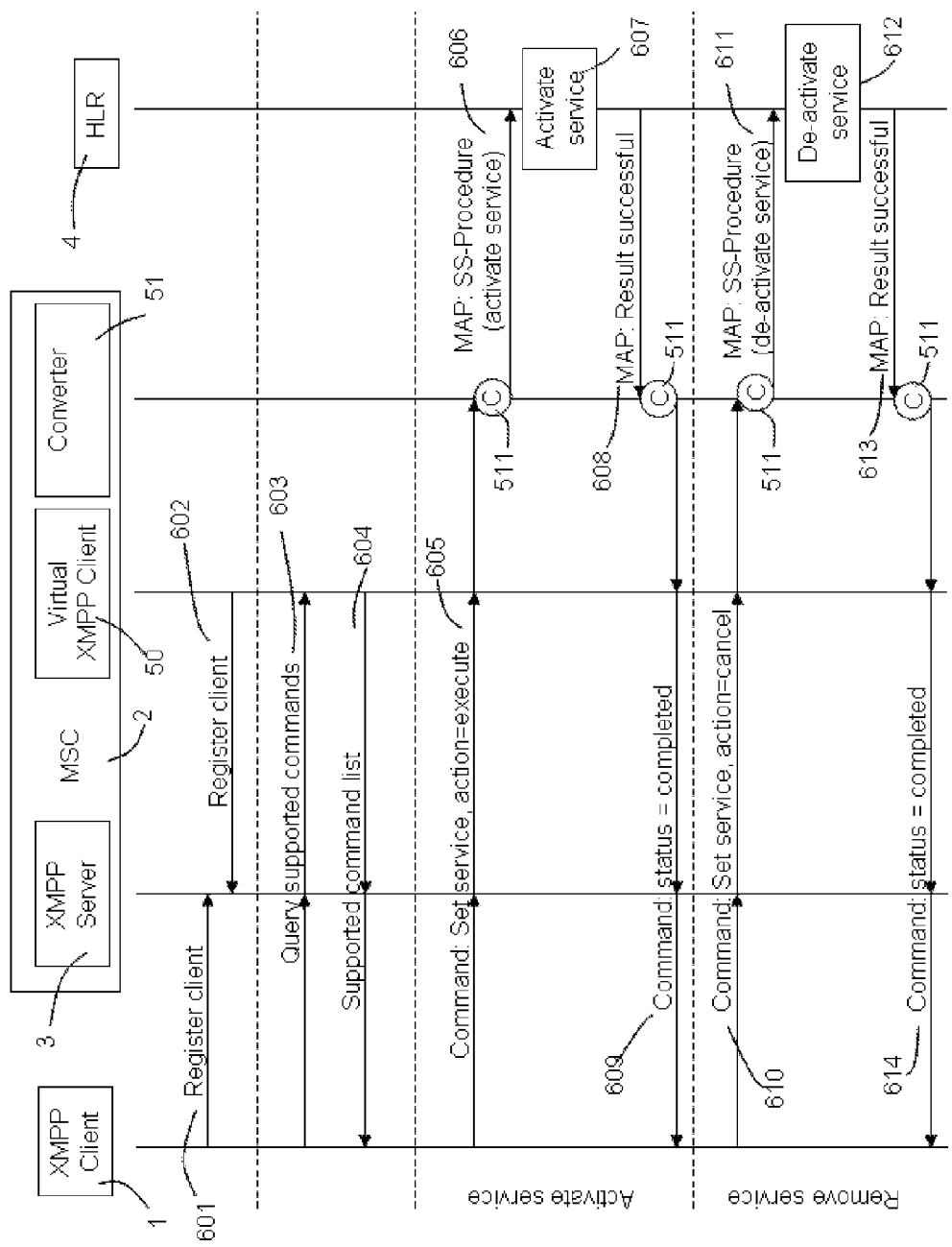
FIG. 6 shows an exemplary sequence diagrams according to one embodiment of the invention.

FIG. 6 shows an embodiment of the invention as a flow chart wherein after an initial step two different procedures (activate service and remove service) are depicted in one chart. This figure shows a XMPP client 1, a MSC 2 and a HLR 4 which communicate with each other. The MSC 2 can also be a MSC server (MSC-S) and comprises a XMPP server 3 which is adapted to communicate with the XMPP client 1 and with the virtual or second XMPP client 50. Further the MSC 2 comprises a converter 51 which is adapted to communicate with the virtual XMPP client 50 and with the HLR 4. The figure is limited to these components due to clarity reasons. Interfaces and other modules in the MSC 2, the HLR 4 and the XMPP client 1 are not depicted.

In a first step 601 the XMPP client 1 registers at the XMPP server 3 to inform the XMPP server 3 that the XMPP client 1 is active and can be reached. The XMPP server 3 knows the user identification of the XMPP client 1 after registration. After the XMPP client 1 has been registered at the XMPP server 3, a second XMPP client 50 is established in the MSC and will be registered in a next step 602 to the XMPP server 3. The second XMPP client 50 is associated to the same user as the XMPP client 1. After both clients 1, 50 have been registered at the XMPP server 3, they are able to send commands towards each other and the XMPP server 3 is able to route these commands from the sending XMPP client 1, 50 to the receiving XMPP client 1, 50. In a further embodiment of the invention, the XMPP client 1 queries the supported commands from the virtual XMPP client 50 in a step 603 to be aware of the commands which can be used. The virtual XMPP client 50 sends back in a next step 604 a list of all supported commands. Both communication steps must be routed via the XMPP server 3. The list of supported commands according to the invention are commands which affects the management of the mobile communication network, like forwarding of calls or blocking of calls. It is also possible that the XMPP client 1 does not need the supported command list from the virtual XMPP client 50 because the commands could be predefined.

To activate a service in the HLR 4, the XMPP client 1 sends an ad-hoc command in a step 605 according to the XMPP extension XEP-0050 via the XMPP server 3 to the virtual XMPP client 50. An example for a service is "Call Forwarding". The ad-hoc command further includes an action indicator which indicates if the action should be executed or canceled. These ad-hoc commands can only be sent to a XMPP client 1, 50. It is not possible to send ad-hoc commands according to the XMPP extension XEP-0050 to a XMPP server 3. The commands must be routed over the XMPP server 3 to the recipient. The virtual XMPP client 50 detects that this ad-hoc command is used to manage the setup of a user preference in the mobile communication network and forward the ad-hoc command to converter 51. The converter 51 converts in a next step 511 the ad-hoc command according to the XMPP extension XEP-0050 into a MAP message for activating the service and sends this MAP message via the HLR interfaces to the HLR 4 in a step 606. In case of the prescribed example "Call Forwarding" the MAP message is CFU (Call Forwarding Unconditional). The HLR 4 activates the service 607. If the MAP message is a CFU message the HLR 4 changes the related forwarding service settings in the subscriber's subscription profile. If the setting is successful the HLR 4 sends back a MAP message 608 to the converter 51 which indicates a successful result. The converter 51 converts 511 this MAP message into an ad-hoc command with the same content and sends the ad-hoc command to the virtual XMPP client 50. The virtual XMPP client 50 sends in a next step 609 the ad-hoc command via the XMPP server 3 to the XMPP client 1 to indicate that the service has successfully been activated. To remove a service the XMPP client 1 sends an ad-hoc command 610 over the XMPP server 3 to the virtual XMPP client 50 which indicates that a service should be canceled. The virtual XMPP client 50 detects that this command has to be worked by a HLR 4 and forward this message to the converter 51. The converter 51 converts the ad-hoc command into a MAP message and sends in a next step 611 this message to the HLR 4 to de-activate a service 612. The result will be send in a next step 613 to the converter 51, converted 511 by the converter 51 into an ad-hoc command and send to the virtual XMPP client 50 via the XMPP server 3 to the XMPP client 1 as a next step 614. Both procedures (activate and remove services) can be compared with regard to the communication steps.

As an additional feature the activation and de-activation of services like the call forwarding service or call barring service can be automatized. If the external XMPP client 1 logs off or de-register from the XMPP server or if the XMPP client 1 becomes unreachable in case of a mobile packet data access the virtual XMPP client 50 can automatically cancel any call forwarding service to this specific XMPP client 1 using the same procedure as shown in FIG. 6. It might also be possible to automatically activate the service call barring to block a call to a de-registered or unreachable XMPP client 1. Further it is possible that if the XMPP client 1 has been registered at the XMPP server 3, the virtual XMPP client 50 will automatically activate the call forwarding service so that every call to this subscriber will automatically be forwarded to the XMPP client 1. This automatization can be implemented by using well known XMPP mechanisms. The XMPP client 50 subscribes to the presence information of the XMPP client 1. The XMPP server 3 then takes care to inform the XMPP client 50 when XMPP client 1 registers or de-registers.

Figure 7:
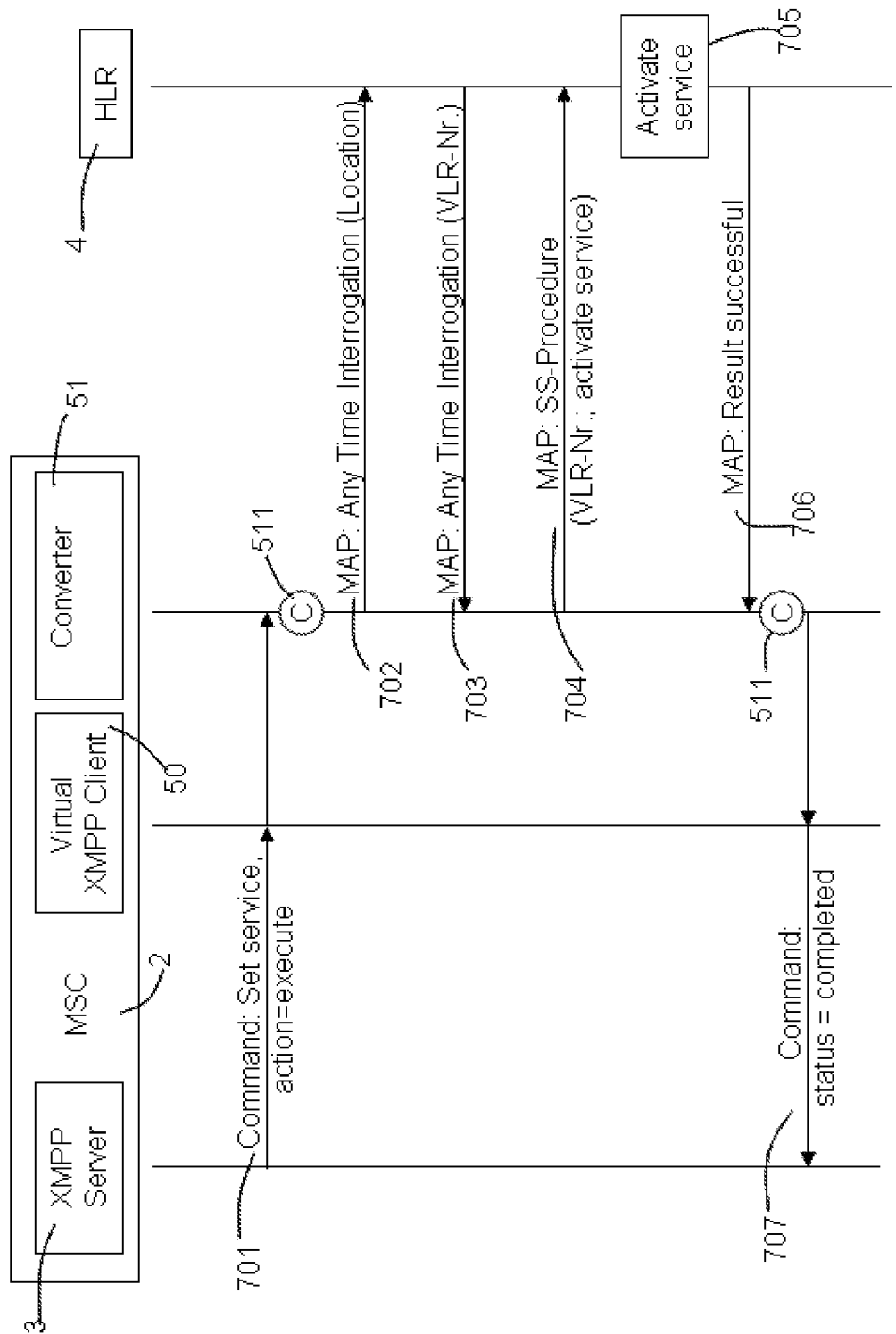
FIG. 7 shows an exemplary sequence diagrams according to another embodiment of the invention.

FIG. 7 shows a special setup where the mobile subscriber 18 is registered in another MSC which does not comprise a XMPP server or virtual XMPP client. The XMPP client 1 of the subscriber is still in registered at the XMPP server 3 of the MSC 2 which is not the serving MSC for the mobile subscriber 18. If the XMPP client 1 of the mobile subscriber 18 wants to set a service in the HLR 4 it is not possible for the MSC 2 to change settings in the HLR 4 via MAP message for this not registered subscriber. FIG. 7 shows just the message flow between the MSC 2 and its containing entities and the HLR 4. An ad-hoc command for setting a service has been received in a first step 701 by the XMPP server 3 from a XMPP client 1 wherein the subscriber 18 of this XMPP client 1 is not registered at this MSC 2. The ad-hoc command will be routed to the second or virtual XMPP client 50. The XMPP client 50 recognizes that the received ad-hoc command is for setting up a service in the HLR 4 and send the ad-hoc command to the converter 51 indicating that the MSC 2 is not the serving MSC for the subscriber. The converter 51 converts 511 the ad-hoc command into a MAP service setting (SS) procedure. Before this MAP SS-procedure will be send to the HLR 4 in step 704 the converter 51 will send a MAP: Any Time Interrogation (Location) message 702 to HLR 4 to query the VLR number of the VLR which actually serves the subscriber 18. The HLR 4 sends back in a next step 703 the VLR number in a MAP: Any Time Interrogation message (VLR-Nr.). The converter 51 uses the received VLR number of the serving MSC/VLR and fake to be the serving MSC by using the received VLR number in the MAP service setting message 704. This VLR number is not used for other purposes like routing. The HLR 4 will activate the service in a further step 706. The converter 51 receives the MAP: result successful message in a next step 706 and convert 511 this message into an ad-hoc command: status completed. This ad-hoc command is send to the virtual XMPP client 50 in a next step 707 which forward this command via the XMPP server 3 to the external XMPP client 1 of the subscriber 18. This roaming situation can also be applied for the cancellation of service in the HLR 4.

The invention claimed is:

1. A method for configuring service settings for a mobile subscriber in a mobile communication network wherein the mobile subscriber is associated with a first instant communication client which is adapted to communicate via an instant messaging protocol with an instant communication server, and wherein the instant communication server is associated to a mobile switching center of the mobile communication network, the method comprises:
   sending, by the first instant communication client, an instant service command via the instant communication server to a second instant communication client, associated with the mobile switching center;
   converting, by the mobile switching center, the instant service command into a service setting message; and
   sending the service setting message to a user database to modify service settings for the mobile subscriber,
   wherein:
   the first instant communication client queries a list of supported instant service commands from the second instant communication client; and
   the service setting message is sent to the user database only if the instant service command is in the list of supported instant service commands.

2. A method for configuring service settings for a mobile subscriber in a mobile communication network wherein the mobile subscriber is associated with a first instant communication client which is adapted to communicate via an instant messaging protocol with an instant communication server, and wherein the instant communication server is associated to a mobile switching center of the mobile communication network, the method comprises:
   sending, by the first instant communication client, an instant service command via the instant communication server to a second instant communication client, associated with the mobile switching center;
   converting, by the mobile switching center, the instant service command into a service setting message; and
   sending the service setting message to a user database to modify service settings for the mobile subscriber,
   wherein the instant service command comprises an action indicator which indicates if a service should be activated or deactivated.

3. The method according to claim 2, wherein the second instant communication client is assigned to the mobile subscriber.

4. The method according to claim 2, wherein the second instant communication client is established and registered at the instant communication server after the first instant communication client has been registered at the instant communication server.

5. The method according to claim 2, wherein the second instant communication client is established by obtaining mobile subscriber data from the user database.

6. The method according to claim 2, wherein the user database is a home location register, HLR, and wherein the service setting message is a mobile application part, MAP, message.

7. A method for configuring service settings for a mobile subscriber in a mobile communication network wherein the mobile subscriber is associated with a first instant communication client which is adapted to communicate via an instant messaging protocol with an instant communication server, and wherein the instant communication server is associated to a mobile switching center of the mobile communication network, the method comprises:
   sending, by the first instant communication client, an instant service command via the instant communication server to a second instant communication client, associated with the mobile switching center;
   converting, by the mobile switching center, the instant service command into a service setting message; and
   sending the service setting message to a user database to modify service settings for the mobile subscriber,
   wherein the service setting message is automatically sent to the user database to:
   activate a call forwarding service to the first instant communication client if the first instant communication client has been registered at the instant communication server, or
   deactivate a call forwarding service to the first instant communication client if the registration of the first instant communication client at the instant communication server has been canceled.

8. A method for configuring service settings for a mobile subscriber in a mobile communication network wherein the mobile subscriber is associated with a first instant communication client which is adapted to communicate via an instant messaging protocol with an instant communication server, and wherein the instant communication server is associated to a mobile switching center of the mobile communication network, the method comprises:
   sending, by the first instant communication client, an instant service command via the instant communication server to a second instant communication client, associated with the mobile switching center;

converting, by the mobile switching center, the instant service command into a service setting message; and sending the service setting message to a user database to modify service settings for the mobile subscriber, wherein:

the instant messaging protocol is the Extensible Messaging and Presence Protocol, XMPP, and wherein the first and second instant communication client are XMPP clients and the instant communication server is a XMPP server; and the instant service command is an XMPP ad-hoc command.

9. A method for configuring service settings for a mobile subscriber in a mobile communication network wherein the mobile subscriber is associated with a first instant communication client which is adapted to communicate via an instant messaging protocol with an instant communication server, and wherein the instant communication server is associated to a mobile switching center of the mobile communication network, the method comprises:

sending, by the first instant communication client, an instant service command via the instant communication server to a second instant communication client, associated with the mobile switching center;

converting, by the mobile switching center, the instant service command into a service setting message; and sending the service setting message to a user database to modify service settings for the mobile subscriber, wherein the second instant communication client is instantiated as a virtual instant communication client in the mobile switching center.

10. A method for configuring service settings for a mobile subscriber in a mobile communication network wherein the mobile subscriber is associated with a first instant communication client which is adapted to communicate via an instant messaging protocol with an instant communication server, and wherein the instant communication server is associated to a mobile switching center of the mobile communication network, the method comprises:

sending, by the first instant communication client, an instant service command via the instant communication server to a second instant communication client, associated with the mobile switching center;

converting, by the mobile switching center, the instant service command into a service setting message; and sending the service setting message to a user database to modify service settings for the mobile subscriber, wherein the mobile switching center queries the number of the visitor location register, VLR, of a second mobile switching center which serves the mobile subscriber from the user database and using the queried VLR number when converting the instant service command into a service setting message.

11. A mobile switching center, comprising:

an instant communication server adapted to receive an instant service command from a first instant communication client and to route the instant service command to a second instant communication client;

a second instant communication client adapted to receive the instant service command and forward the instant service command to a converter if the instant service command is for setting up a service in a user database; and a converter adapted to receive the instant service command from the second instant communication client and to convert the instant service command into a service setting message, and to send the converted service setting command to a user database, wherein:

the first instant communication client queries a list of supported instant service commands from the second instant communication client; and the service setting message is sent to the user database only if the instant service command is in the list of supported instant service commands.

12. A mobile switching center, comprising:

an instant communication server adapted to receive an instant service command from a first instant communication client and to route the instant service command to a second instant communication client;

a second instant communication client adapted to receive the instant service command and forward the instant service command to a converter if the instant service command is for setting up a service in a user database; and a converter adapted to receive the instant service command from the second instant communication client and to convert the instant service command into a service setting message, and to send the converted service setting command to a user database, wherein the instant service command comprises an action indicator which indicates if a service should be activated or deactivated.

13. The mobile switching center according to claim 12, wherein the second instant communication client is assigned to the mobile subscriber.

14. The mobile switching center according to claim 12, wherein the second instant communication client is established and registered at the instant communication server after the first instant communication client has been registered at the instant communication server.

15. The mobile switching center according to claim 12, wherein the second instant communication client is established by obtaining mobile subscriber data from the user database.

16. The mobile switching center according to claim 12, wherein the instant messaging protocol is the Extensible Messaging and Presence Protocol, XMPP, and wherein the first and second instant communication client are XMPP clients and the instant communication server is a XMPP server.

17. A mobile switching center, comprising:

an instant communication server adapted to receive an instant service command from a first instant communication client and to route the instant service command to a second instant communication client;

a second instant communication client adapted to receive the instant service command and forward the instant service command to a converter if the instant service command is for setting up a service in a user database; and a converter adapted to receive the instant service command from the second instant communication client and to convert the instant service command into a service setting message, and to send the converted service setting command to a user database, wherein the converter is further adapted to:

activate a call forwarding service to the first instant communication client if the first instant communication client has been registered at the instant communication server, or deactivate a call forwarding service to the first instant communication client if the registration of the first instant communication client at the instant communication server has been canceled.

* * * * *